United States Patent [19]

Griffith

[11] 4,022,957

[45] May 10, 1977

[54] THERMOPLASTIC NITRILE RESINS

[75] Inventor: Russell K. Griffith, Chagrin Falls, Ohio

[73] Assignee: Standard Oil Company, Cleveland, Ohio

[22] Filed: May 23, 1973

[21] Appl. No.: 363,011

[52] U.S. Cl. ................................ 526/87; 526/292; 526/297; 526/338

[51] Int. Cl.² ........................................ C08F 36/06

[58] Field of Search ............ 260/82.3; 526/87, 338, 526/297

[56] References Cited

UNITED STATES PATENTS

| | | | |
|---|---|---|---|
| 2,179,040 | 11/1939 | Heuer | 260/82.3 |
| 2,374,841 | 5/1945 | Semon | 260/82.3 |
| 3,763,278 | 10/1973 | Griffith | 260/879 |

FOREIGN PATENTS OR APPLICATIONS

| | | | |
|---|---|---|---|
| 448,208 | 4/1948 | Canada | 260/82.3 |
| 1,123,114 | 9/1970 | Germany | 260/879 |

OTHER PUBLICATIONS

Billmeyer, F. W., Textbook of Polymer Chemistry, Interscience Publishers, N. Y., 1962, p. 324.

*Primary Examiner*—Paul R. Michl
*Attorney, Agent, or Firm*—John F. Jones; Sherman J. Kemmer

[57] ABSTRACT

Thermoplastic polymers having high heat-distortion temperatures and low permeability to gases and vapors are prepared by copolymerizing in a specified manner an olefinic nitrile, such as acrylonitrile, with a small amount of a conjugated diene, such as butadiene.

7 Claims, No Drawings

THERMOPLASTIC NITRILE RESINS

The present invention relates to novel polymeric compositions which have excellent heat-distortion temperatures, low creep rates, and low permeability to gases and vapors, and more particularly pertains to polymeric compositions which function as gas and vapor barrier materials and are composed of conjugated diene monomer and an olefinically unsaturated nitrile, and to a process for preparing same.

Copolymers of acrylonitrile and butadiene are well known, particularly the nitrile rubbers which are usually composed of at least 50% by weight of butadiene and no more than 50% by weight or acrylonitrile. The nitrile rubbers generally have low heat-distortion temperatures, high creep rates, and are poor vapor and gas barrier materials.

The novel polymeric products of the present invention which are of high acrylonitrile content and are prepared in a specific manner are clearly distinguished from the nitrile rubbers and similar materials of the prior art because of their resemblance to and in some cases superiority over many known engineering thermoplastic materials.

The novel polymeric products of the present invention are prepared by polymerizing in a specified manner a major proportion of an olefinically unsaturated nitrile, such as acrylonitrile, and a minor proportion of a conjugated diene monomer, such as butadiene-1,3.

The conjugated diene monomers useful in the present invention include butadiene-1,3, isoprene, chloroprene, bromoprene, cyanoprene, 2,3-dimethylbutadiene-1,3, 2-ethyl-butadiene-1,3, 2,3-diethylbutadiene-1,3, and the like, and others. Most preferred for the purposes of this invention are butadiene and isoprene because of their ready availability and their excellent copolymerization properties.

The olefinically unsaturated nitriles useful in the present invention are the alpha,beta-olefinically unsaturated mononitriles having the structure

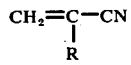

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile, methacrylonitrile, and mixtures thereof.

The polymeric compositions of the present invention can be prepared by any of the known general techniques of polymerization including the bulk polymerization, solution polymerization, and emulsion or suspension polymerization techniques by continuous or intermittent addition to the polymerization mixture of the butadiene or butadiene and acrylonitrile. The preferred method is polymerization in an aqueous medium and preferably in an aqueous emulsion. The important point in the novel process of this invention is that the novel polymeric products are prepared by polymerizing the olefinically unsaturated nitrile and the conjugated diene monomer in such a manner that a uniform or homogeneous copolymer results, and the conversion of monomers to polymer is always at least 50% by weight. By uniform or homogeneous copolymer I mean that substantially all of the polymer chains are composed of both butadiene and acrylonitrile moieties.

It has been found that when copolymers of acrylonitrile and butadiene are prepared from mixtures composed of a major portion of acrylonitrile and a minor portion of butadiene by a batch process, the resulting copolymer is not uniform but consists of a complex mixture of acrylonitrilebutadiene copolymers and polyacrylonitrile which is usually not thermoplastic.

It is therefore essential in my process that in the copolymerization of a major portion of acrylonitrile and a minor portion of butadiene there be present during the entire course of the polymerization some butadiene monomer available for the copolymerization reaction so that essentially no acrylonitrile homopolymer is formed. This is usually done by either adding the butadiene to the reaction medium continuously during the course of the reaction alone or in conjunction with acrylonitrile if so desired. A convenient method for adding the butadiene to the polymerization medium continuously during the polymerization reaction is to add it in gaseous form and to maintain a predetermined gaseous pressure of butadiene in the polymerization medium during the entire course of the polymerization reaction. The butadiene pressure can be varied by changing the butadiene reservoir temperature.

The polymerization is preferably carried out in an aqueous medium in the presence of an emulsifier and a free-radical generating polymerization initiator at a temperature of from about 0° to 100° C or higher in the substantial absence of molecular oxygen.

The preferred polymeric compositions embodied herein are those resulting from the polymerization of (A) from 80 to 98% by weight and preferably 85 to 98% by weight of at least one nitrile monomer having the structure

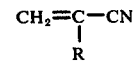

wherein R has the foregoing designation, and (B) from 20 to 2% by weight and preferably 15 to 2% by weight of a conjugated diene monomer selected from the group consisting of butadiene and isoprene.

More specifically, the present invention can be illustrated in the polymerization of a mixture of acrylonitrile and butadiene to produce a processable thermoplastic resin having a high heat-distortion temperature as well as excellent impermeability to gases and vapors when exposed to said gases and vapors in the form of a film or thin sheet. Preferably, the butadiene is slowly added to the polymerization during the course of the reaction, as will be more completely described below.

Although it is preferred to employ from 85 to 98% by weight of acrylonitrile and correspondingly 15 to 2% by weight of butadiene in the polymerization, it has generally been found that as the relative proportion of acrylonitrile to butadiene is increased, the gas and vapor barrier properties increase somewhat, but processability of the resinous product sometimes suffers. Thus, it is generally desirable to use just enough butadiene to give the desired processability and at the same time keep optimum gas and vapor barrier properties.

The novel polymeric products of the present invention are thermoplastic materials which can be thermoformed into a wide variety of useful articles such as films, fibers, bottles, boxes, and the like in any of the conventional ways employed with known thermoplastic polymeric materials, such as by extrusion, milling, molding, drawing, blowing, etc. The polymeric products of this invention have excellent solvent resistance, and their low permeability to gases and vapors make them very useful in the packaging industry, and they are particularly useful in the manufacture of bottles, film, and other types of containers for liquids and solids. The polymeric products of this invention can be considered as engineering thermoplastics, and their properties can be further improved by the addition of reinforcing agents such as glass fibers to them.

In the following illustrative examples, the amounts of ingredients are expressed in parts by weight unless otherwise indicated.

EXAMPLE 1

A. A thermoplastic copolymer of acrylonitrile and butadiene embodied in the present invention was prepared from the following ingredients:

| Ingredient | Parts |
|---|---|
| water | 250 |
| Alipal CO-436 soap* | 1.0 |
| acrylonitrile | 100 |
| t-dodecyl mercaptan | 1.5 |
| ammonium persulfate | 0.05 |

*Ammonium salt of sulfated nonylphenoxypoly(ethyleneoxy) ethanol.

The reactor was charged with the foregoing ingredients and was purged with nitrogen and was evacuated under a partial vacuum. A line to the reactor was connected to a cylinder of butadiene monomer, and gaseous butadiene was passed into the reactor to a pressure of about 20 psi. The butadiene pressure was maintained and the reaction was carried out at 70° C with agitation for a period of about 112 minutes, during which time 8.84 parts of butadiene were used from the cylinder. The resulting copolymer was recovered in 56.8% yield. The resin had a Brabender plasticorder torque of 2320 meter grams (230° C and 35 rpm to constant torque). A transparent test bar was prepared by compression molding and was found to have a heat-deflection temperature (ASTM D-648) of 79° C at 264 psi and a flex creep rate (ASTM D-674 modified) of 0.27% per hour under 3000 psi at 100° F and the following physical properties:

| | |
|---|---|
| flexural strength | $12.4 \times 10^3$ psi (ASTM D-790) |
| flexural modulus | $5.89 \times 10^5$ psi (ASTM D-790) |
| tensile strength | $11.6 \times 10^3$ psi (ASTM D-638) |
| notched Izod impact strength | 0.19 foot pounds per inch of notch (ASTM D-256) |

Infrared analysis of this resin showed it to be composed of 87% by weight of acrylonitrile and 13% by weight of butadiene. The barrier properties of this resin were determined and were found to be as follows:

| | |
|---|---|
| oxygen transmission rate (ASTM D-1434-66) | 0.45 cc/mil/100 square inches/24 hours/atmosphere at 73° F |
| water vapor transmission rate (ASTM E-96-63, Method E) | 3.1 grams/mil/100 square inches/24 hours at 100° F and 90% relative humidity |

B. A copolymer which is outside the scope of the present invention was prepared according to A of this example except that 10 parts of liquid butadiene were initially charged with the rest of the ingredients in the polymerization reactor. As determined by pressure drop during the polymerization reaction, the butadiene was essentially all polymerized by the time 59% conversion of monomers to polymer was reached. The final conversion was 79%. The resin thus prepared was found to be infusible in the Brabender plasticorder and infrared analysis showed the polymer composition to be 91% by weight of acrylonitrile and 9% by weight of butadiene. Compression molded bars (215° C at 560 psi) of this resin were found to have the following physical properties:

| | |
|---|---|
| heat-deflection temperature | 74° C (ASTM D-648) |
| flexural strength | $3.05 \times 10^3$ psi |
| flexural modulus | $4.02 \times 10^5$ psi |
| tensile strength | $3.93 \times 10^3$ psi |
| notched Izod impact strength | 0.17 foot pounds per inch of notch (ASTM D-256) |

EXAMPLE 2

The procedure described in Example 1A was repeated several times with various pressures of gaseous butadiene being maintained on the polymerization mixture to produce acrylonitrile-butadiene copolymers having various levels of butadiene in them. The results of these polymerizations are given in the following table:

| Weight % Butadiene in Polymer | Heat Distortion Temperature | Brabender Plasticorder Torque (meter grams) | Creep Rate |
|---|---|---|---|
| 12 | 78° C | 1870 | 0.277 |
| 9 | 81° C | 3200 | 0.251 |
| 7 | 81° C | 3730 | not determined |
| 4 | 84° C | 3500 | not determined |

All of these resins were found to have very low oxygen and water vapor transmission rates comparable to the resin of Example 1A.

EXAMPLE 3

The procedure of Example 1A was repeated using different pressures of butadiene to prepare acrylonitrilebutadiene copolymers which are outside the scope of the present invention primarily because of their very low heat-distortion temperatures. The results of these polymerizations are given in the following table:

| Weight % Butadiene in Polymer | Heat Distortion Temperature | Brabender Plasticorder Torque (meter grams) |
|---|---|---|
| 33 | 38° C | 1800 |
| 21 | 49° C | 1600 |

I claim:
1. The process for preparing a thermoplastic resin comprising polymerizing in an aqueous medium a mixture consisting of
A. from 85 to 98% by weight of at least one nitrile monomer having the structure

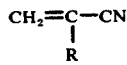

wherein R is hydrogen, a lower alkyl group having from 1 to 4 carbon atoms, or a halogen, and
B. from 15 to 2% by weight of a conjugated diene monomer selected from the group consisting of butadiene and isoprene in such a manner that some of (B) is always present during the entire course of the polymerization.

2. The process of claim 1 carried out in an aqueous emulsion.

3. The process of claim 2 in which the diene monomer is present primarily in the vapor phase and the resin is produced in at least 50% by weight conversion.

4. The process of claim 3 wherein the polymerization is carried out at a temperature in the range of about 0° to 100° C in the substantial absence of molecular oxygen.

5. The process of claim 4 wherein the diene monomer is butadiene.

6. The process of claim 5 wherein the nitrile monomer is acrylonitrile.

7. The resin produced by the process of claim 1.

* * * * *